UNITED STATES PATENT OFFICE.

FERDINAND GERHARD WIECHMANN, OF NEW YORK, N. Y., ASSIGNOR TO FENOFORM CORPORATION, OF HASTINGS-UPON-HUDSON, NEW YORK, A CORPORATION OF NEW YORK.

PLASTIC MATERIAL AND PROCESS OF PREPARING SUCH PLASTIC MATERIAL.

1,061,346.     Specification of Letters Patent.     Patented May 13, 1913.

No Drawing.     Application filed November 13, 1909. Serial No. 527,753.

*To all whom it may concern:*

Be it known that I, FERDINAND GERHARD WIECHMANN, a citizen of the United States, residing at New York city, county and State of New York, have invented a Plastic Material and Process of Preparing Such Plastic Material, of which the following is a specification.

In my Patent No. 883,995 dated April 7th, 1908, I have described a process of producing a plastic body simulating rubber, which process consists in subjecting vegetable albumin to the action of a solvent, *i. e.*, a body with which the vegetable albumin may chemically combine to form a new product, and I have described such solvent as a solution of animal casein.

In my Patent No. 932,527 dated August 21st, 1909, I have described the treatment of the product obtained from the process above set forth, to render it impervious to the action of moisture and water, which consists in subjecting said product to the action of formaldehyde. Further, in my first named patent I have described subjecting the product of the process set forth, to the action of heat and pressure. My present process differs from that above described in that I substitute for the solvent (casein), phenol, or any homologue thereof, with or without the addition of the alkali or acid mentioned in my patent.

To carry my invention into effect, I proceed as follows:

Example 1: To 50 parts of an albuminoid (thereby including a vegetable or animal or synthetically produced albumin), or cellulose, I add 25 parts of phenol and boil this mixture in a return still for a sufficient length of time to bring about a chemical combination between the albuminoids or cellular body and the phenol. I find the best results are obtained by using a temperature over 100° C. After a chemical change has taken place in the mixture, due to the boiling as above described, I add 25 parts of formaldehyde and subject the combined bodies to pressure to prevent increase in bulk of the formaldehyde or volatilization of the molecule of water which is evolved due to the reaction between the phenol and the formaldehyde, and which reaction may be described as dissociation, after which all the materials are subjected to a temperature in excess of 100° C. until such time as there has been a reaction between the contained phenol and the formaldehyde, possibly involving the albuminoid or cellulose filling body used.

I wish it understood that I do not limit myself in any wise to the employment of an artificial pressure in the final step, as the required pressure or force to prevent dissociation may be created by other means known to chemists.

Example 2: I take 50 parts of ground vegetable ivory. This I first heat and then to this I gradually add 25 parts of phenol (in the form of a spray), and simultaneously, successively or subsequently 25 parts of formaldehyde. In a case where the phenol is first added it may be introduced at the pressure of the atmosphere. When the formaldehyde is subsequently added it must be introduced under conditions which will not permit of expansion in bulk at the time of its introduction or in the subsequent process. To accomplish this I may oppose an artificial pressure (mechanically or otherwise produced) introducing the formaldehyde at a slightly greater pressure, subsequently balancing the pressures, after which the combined bodies are subjected to the action of a temperature in excess of 100° C. Regarding this step I would state that I prefer to introduce the phenol prior to the introduction of the formaldehyde, as by so doing an intimate mixture with the albuminoid or cellulose is obtained prior to the introduction of the formaldehyde. Where the phenol and formaldehyde are introduced at the same time, the formaldehyde tends to coat the albuminoid or cellular bodies and thus interferes with an intimate mixture between such bodies and the phenol.

Example 3: 50 parts of an albuminoid or cellular body may be mixed cold, with 25 parts of phenol, and brought into intimate contact for an hour or so, by stirring or otherwise, after which 25 parts of formaldehyde are added and the mass heated and subjected to pressure to prevent disassociation, etc., a temperature sufficient to effect chemical combination between the different bodies. I may, in connection with the materials above specified, use any suitable loading or coloring materials. I may also use various materials for altering the hardness or elasticity of the body, such for instance as those used in the manufacture of rubber.

The product obtained from my process above described may be fluid, semi-fluid, or a hard, insoluble, infusible solid, which conditions can be obtained by altering the proportions of the materials introduced and varying the degree of chemical action which may take place, as by stopping the process at certain times.

Having thus described my invention, I claim:

1. A process of treating an albuminoid of the character described, which consists in subjecting it first to the action of a solvent of the character indicated and then to the action of formaldehyde, and aiding chemical reactions by the application of heat and pressure.

2. A process of treating vegetable albumin which consists in subjecting it to the action of phenol and subsequently to the action of formaldehyde and aiding the chemical reactions by the application of heat and pressure.

3. A process of treating vegetable albumin which consists in reducing it to a divided condition, then subjecting it to the action of phenol, then the combined mass to the action of formaldehyde and aiding the chemical reactions by heat and pressure.

4. A process of producing the product herein described which consists in first effecting a chemical combination between vegetable albumin and phenol and subsequently between the combined vegetable albumin and phenol and formaldehyde, under conditions of heat and pressure which will permit such chemical combinations to be formed.

5. A process of producing the product herein described which consists in subjecting an albuminoid to the action of a body of the phenol group and subsequently to the action of a body which will chemically combine with the product derived from the union of the first two mentioned bodies.

6. A process of producing the product herein described which consists in subjecting an albuminoid to the solvent action of a body of the phenol group and to the action of formaldehyde, and subsequently all of said bodies to the action of sufficient temperature to effect chemical combinations.

7. A process of treating an albuminoid which consists in subjecting it first to the solvent action of a phenol and then to the action of a body which will chemically combine with the product derived from the union of the first two mentioned bodies.

8. As a new composition of matter, a hard, infusible product formed by subjecting an albuminoid to the solvent action of phenol and subsequently to the action of formaldehyde and heat.

9. A process of treating an albuminoid, which consists in subjecting it to the solvent action of phenol and to the action of a body which will chemically combine with the product derived from the action of the phenol upon the albuminoid, and under temperature conditions where the temperature is in excess of 100° centigrade.

In testimony whereof, I affix my signature, in the presence of two witnesses.

FERDINAND GERHARD WIECHMANN.

Witnesses:
W. A. TOWNER, Jr.,
ELIZABETH BARNETT.